United States Patent [19]

Hunter

[11] Patent Number: 4,509,501

[45] Date of Patent: Apr. 9, 1985

[54] SOLAR ENERGY COLLECTING SYSTEM USING A PRIMARY REFLECTOR BASED ON A PYRAMID STRUCTURE

[76] Inventor: Larry D. Hunter, 1920 Hillcrest Rd., Apt. 20, Hollywood, Calif. 90068

[21] Appl. No.: 339,069

[22] Filed: Jan. 13, 1982

[51] Int. Cl.³ .............................................. F24J 3/02
[52] U.S. Cl. ................................... 126/439; 126/438; 126/424; 126/425; 350/632
[58] Field of Search ............... 126/438, 439, 424, 425; 350/288, 293, 299

[56] References Cited

U.S. PATENT DOCUMENTS

| | | | |
|---|---|---|---|
| 1,671,086 | 5/1928 | Stimson | 350/103 |
| 3,295,512 | 1/1967 | McCusker | 126/451 |
| 3,892,433 | 7/1975 | Blake | 126/425 X |
| 3,905,352 | 9/1975 | Jahn | 126/438 |
| 3,974,824 | 8/1976 | Smith | 126/438 |
| 3,979,597 | 9/1976 | Drucker | 126/439 X |
| 4,003,756 | 1/1977 | Abrams | 136/246 |
| 4,020,827 | 5/1977 | Broberg | 126/438 |
| 4,047,517 | 9/1977 | Arnberg | 350/288 X |
| 4,090,493 | 5/1978 | Kneer | 126/439 |
| 4,132,221 | 1/1979 | Orillion | 126/450 X |
| 4,184,481 | 1/1980 | Tornquist | 126/450 X |
| 4,215,410 | 7/1980 | Weslow et al. | 126/424 X |
| 4,266,179 | 5/1981 | Hamm, Jr. | 126/439 X |
| 4,313,024 | 1/1982 | Horne | 136/246 |

FOREIGN PATENT DOCUMENTS 2827708  1/1979  Fed. Rep. of Germany ...... 126/439

OTHER PUBLICATIONS

"Sun Power", Chem. Tech., Aug. 1980, pp. 514–519, John T. Holmes.
Second Generation Heliostat Design, by Joseph A. Pietsch, Northrup Inc., at Department of Energy Solar Central Receiver Semiannual Meeting, San Francisco, CA, Oct. 16, 1980.
"The Great Pyramid: Its Divine Message", by D. Davidson et al., 6th Rev. Ed., Williams & Norgate, Ltd., London, 1936.
Sight Reduction Tables for Marine Navigation, U.S. Govt. Printing Office, Washington: 1975.
The Nautical Almanac for the year 1982, Washington: United States Naval Observatory, 1980.

Primary Examiner—Larry Jones
Attorney, Agent, or Firm—Charles H. Thomas

[57] ABSTRACT

A primary reflector formed as a modified pyramid having a polygonal base located in open exposure to the sun has faces above the base which include reflecting surfaces that intersect at obtuse angles along lines lying in planes perpendicular to the base. The reflecting surfaces form a dihedral and are constructed of an externally mirrored material to reflect light impingent thereon into a concentrated field of reflection. At least one and preferably a plurality of secondary reflectors are located within the concentrated field of reflection and are oriented to return light reflected from the dihedral surfaces to the apex of the pyramid. A solar energy collector is located at the apex of the primary reflector to concentrate solar energy reflected first from the primary reflector and then from the secondary reflectors. The secondary reflectors may either be stationary within the path of movement of the concentrated field of reflection, or driven to follow the concentrated field of reflection as it moves throughout a solar day.

30 Claims, 24 Drawing Figures

SOLAR ENERGY COLLECTING SYSTEM USING A PRIMARY REFLECTOR BASED ON A PYRAMID STRUCTURE

The present application is a continuation-in-part of U.S. application Ser. No. 205,773, filed Nov. 10, 1980, now abandoned.

BACKGROUND OF THE INVENTION

1. Field of the Invention

The present invention relates to solar energy collection systems, and especially those systems in which solar energy is concentrated upon a single receiver.

2. Description of the Prior Art

Heliostat systems have long been available and date back to ancient times. A heliostat is an instrument that consists of a mirror or plurality of mirrors moved by clockwork for reflecting the sun's rays in a predetermined direction. Current state of the art heliostat systems employ a plurality of mirrors located in open exposure to the sun. The mirrors are all driven under computer control to reflect impinging solar radiation to a central solar collector, or receiver, which typically is located to the south of the reflectors. The reflectors are the heliostat elements which initially receive solar light and reflect it to the receiver. Heliostat systems of this type have been built by Sandia National Laboratories of Albuquerque, N. Mex. One state of the art solar heliostat system is described in the article "Sun Power" by Mr. John T. Holmes in *Chemtech* August, 1980, pages 514–519. Other heliostat systems employing computer controlled reflector alignment arrangements have been built by other entities.

One persistent problem with heliostat systems is that because of the great number of separate heliostat elements required to collect a significant amount of solar energy, at least some of the drive mechanisms for orienting the primary reflectors which receive the initial solar radiation malfunction with considerable frequency. Because of the large number of reflectors which are required, there is typically a very significant percentage of units which are not operational or which operate improperly at any given time. Problems typically occur in the optical shaft position encoders and the electronic interface circuitry located at each reflector, or heliostat. Also, the interference of wind with proper tracking both reduces the efficiency of solar collection and requires a very substantial shock absorbing or support mechanism. This problem increases the power consumption required to orient the heliostats and detracts from the overall power extracted from solar energy collection systems employing a large number of heliostats.

SUMMARY OF THE INVENTION

The present invention, unlike a heliostat system, does not require an inordinately large number of heliostats to track the sun in apparent motion across the sky. The present invention employs a stationary primary reflector located in open exposure to the sun and constructed with a unique geometry which reflects light impingent thereon from the sun into a concentrated field of reflection. Secondary reflectors are located within the concentrated field of reflection and are oriented to return light received from the primary reflector to a solar energy collector. As contrasted with heliostat systems, two stages of reflection are utilized and a single, stationary reflector initially receives all of the solar energy which is ultimately concentrated to perform useful work.

Since the energy reflected from the primary reflector is directed into a concentrated field of reflection, it is possible to utilize a relatively small number of secondary reflectors if the secondary reflectors are driven to follow the concentrated field of reflection as it moves throughout a solar day. Alternatively, a larger number of stationary, secondary reflectors which require no tracking drive mechanism may be employed.

The preferred embodiment of the primary reflector of the invention has a geometry which is modified from that of a pyramid. The preferred embodiment of the primary reflector may be considered to be formed within the volume of a pyramid having a polygonal base. At least one of the faces of the primary reflector above the base is modified from the isosceles triangular face of a pyramid. Instead of being shaped as an isosceles triangle, at least one of the faces of the primary reflector has reflecting surfaces that intersect at an obtuse angle in a line which lies in a plane perpendicular to the base of the pyramid. This line lies very close to, but is not coincident with the apothem of the pyramid within which the primary reflector is constructed. Instead of an isosceles triangular face, as would be formed on a pyramid having a square base, the face of the primary reflector containing the intersecting reflecting surfaces is a dihedral, formed at quite a large obtuse angle as will hereinafter be described.

Preferably also the primary reflector of the invention has a polygonal base inscribed within the pyramid base such that the corners of the pyramid base are coincident with some of the corners of the primary reflector base, and the primary reflector has three levels of reflecting surfaces defined between the polygonal primary reflector base and the apex of the pyramid within which the primary reflector is constructed. The reflecting surfaces at each face of the primary reflector are bounded between adjacent arris lines of the pyramid. The levels of reflectors are delineated by two separate planes spaced above the polygonal base of the primary reflector and parallel thereto. The lowest level of the reflective surfaces includes a reflecting surface shaped as an isosceles triangle having a base forming one of the sides of the polygonal primary reflector base. This isosceles triangle base is positioned equal distance from adjacent corners of the pyramid base and parallel to and inset from a line extending between the adjacent corners. The lowest level of reflectors also includes reflecting surfaces shaped as mirror image parallelograms on either side of the isosceles triangle. These parallelogram surfaces contact each other only at the apex of the isosceles triangle in the lower level of reflectors.

In the level of reflecting surfaces immediately above the lowest level, there are mirror image trapezoidal reflecting surfaces defined between portions of the adjacent arris lines and intersecting at an obtuse angle to form the first dihedral, previously described. The highest level of reflective surfaces includes a second dihedral defined between portions of the aforesaid arris lines. The reflecting surfaces of the second dihedral extend to the apex of the pyramid and lie in planes forming greater angles with the polygonal base than do the planes in which the reflecting surfaces of the first dihedral lie.

The reflecting faces of the primary reflector are preferably mirrored surfaces. The reflecting surfaces may be formed as mirrors by externally silvered glass. Alternatively, the reflecting surfaces may be formed from a highly polished non-transparent material.

When a primary reflector according to the invention is exposed to incident light from a point source, such as the sun, very interesting patterns of reflection occur. The nature of the reflection patterns from such a structure is described in a book entitled "The Great Pyramid—Its Divine Message" by D. Davidson and H. Aldersmith, volume 1, Pyramid Records, London, Williams, and Norgate, Ltd. 6th Edition, 1936. In that book it was observed that The Great Pyramid of Gizeh, Egypt, was not a true quadrahedral pyramid, but that the faces thereof were recessed and bifurcated or "hollowed out" so that the center of each side of the pyramid base was actually inset slightly from a straight line joining the corners of that side of the base.

Until the present invention, however, the significance of the reflection pattern from such a pyramid structure as it relates to the collection and utilization of solar energy has never been appreciated. Light reflected from a pair of adjacent faces of a primary reflecting pyramid, under certain circumstances is concentrated into a triangular shaped area that changes in dimensions as the sun proceeds in its apparent motion across the sky during the solar day and throughout the solar year. Because the light incident on the reflecting surfaces of the pyramid structure is reflected into a relatively compact area, considerable solar energy reflected from the primary reflecting pyramid can be collected from secondary reflectors located within this concentrated area. The secondary reflectors are each positioned in a specific orientation relative to the horizontal to reflect light received from the reflecting surfaces of the primary reflecting pyramid back to the apex of the pyramid. A solar energy collector, such as a tertiary reflector or receiver, is located at the apex of the primary reflecting pyramid. Typically the collector will employ a heat transport fluid which circulates through the collector at the pyramid apex, and is transported downwardly within the confines of the pyramid structure. The reflected solar energy from the secondary reflectors heats the thermal transport fluid. This energy can then be extracted from the heat transport fluid as useable power. However, any other conventional type of solar energy collecting means may be used at the pyramid apex in accordance with the invention.

The invention may be described with greater clarity and particularly by reference to the accompanying drawings.

DESCRIPTION OF THE EMBODIMENT

Figures 1, 3, 3A, 4, 4A:
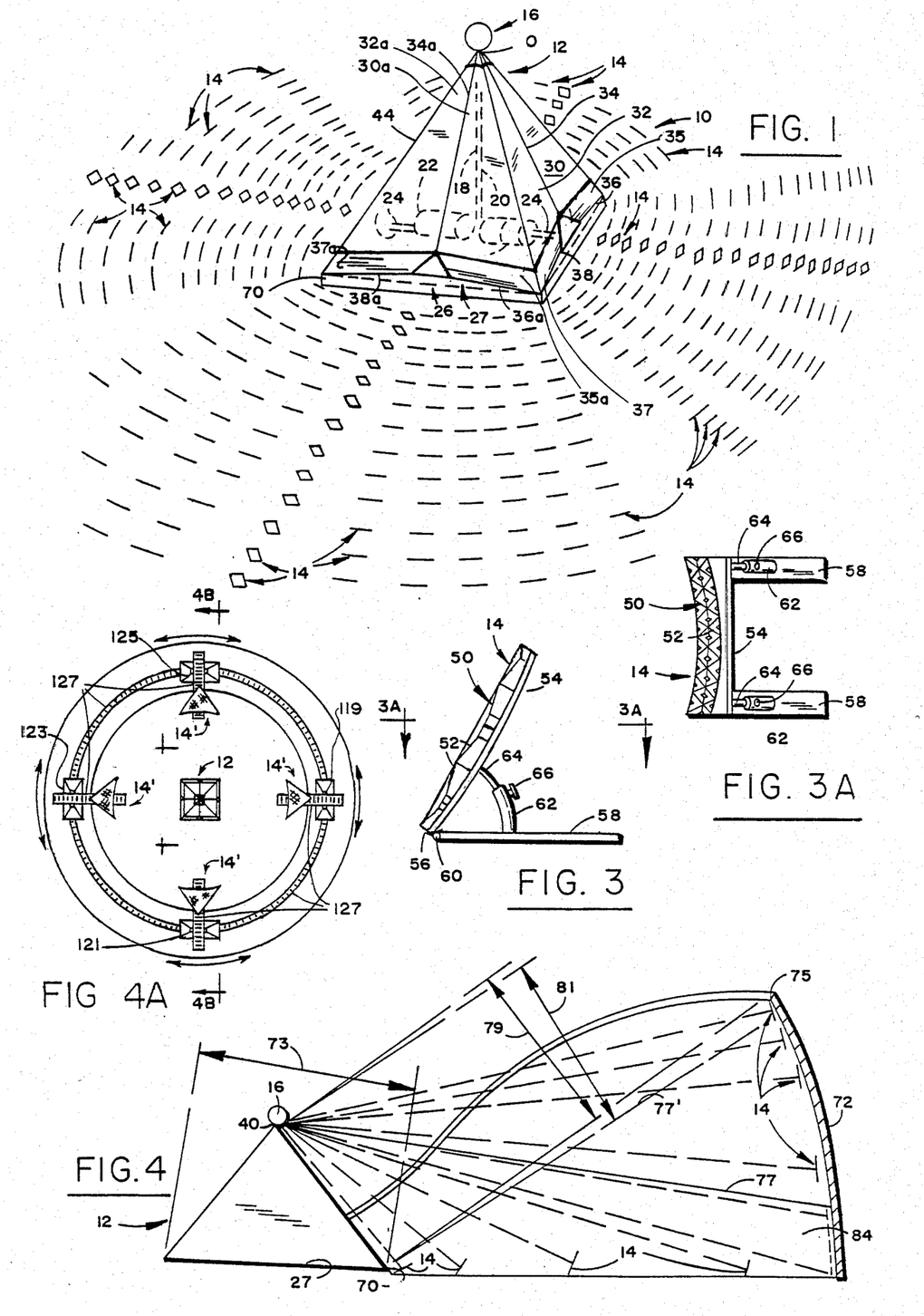
FIG. 1 illustrates in perspective a solar energy collecting system according to the invention.
FIG. 3 is a side elevational view of a single one of the secondary reflectors depicted in FIG. 1.
FIG. 3A is a sectional plan view taken along the lines 3A—3A of FIG. 3.
FIG. 4 illustrates diagrammatically in elevation an arrangement of secondary reflectors relative to the primary reflector alternative to that depicted in FIG. 1.
FIG. 4A illustrates diagrammatically in plan view a further alternative arrangement of secondary reflectors relative to a primary reflector.
Figure 2:
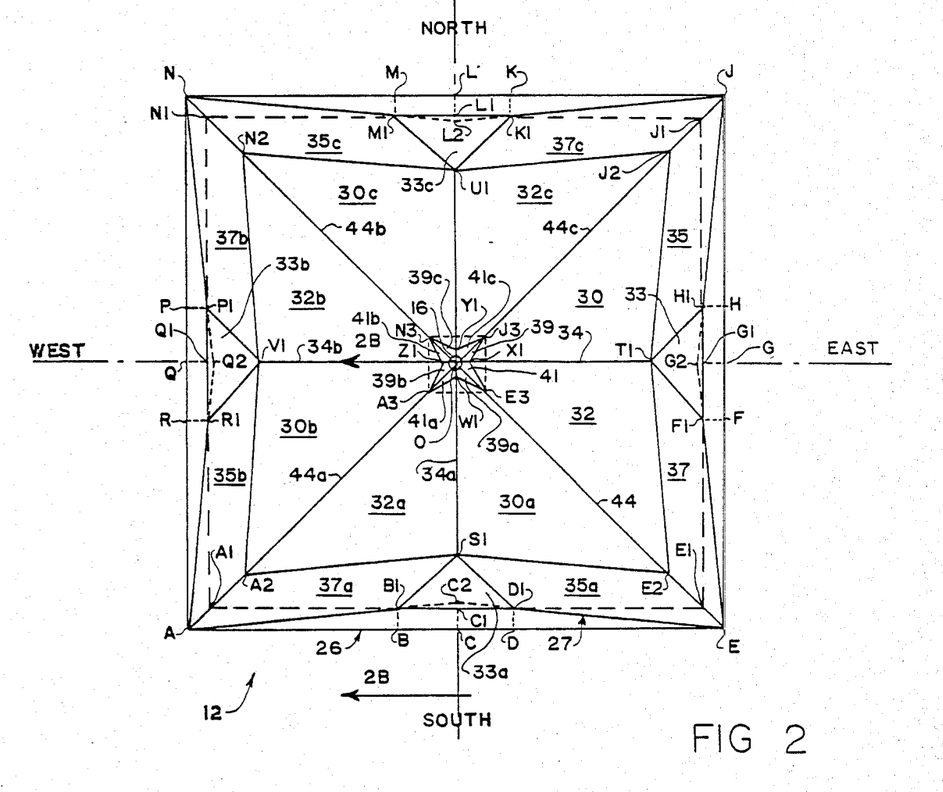
FIG. 2 is a diagrammatic top plan view of the primary reflector employed in the system of FIG. 1.

FIG. 1 illustrates in perspective a solar energy collecting system 10 according to the invention which includes a primary reflector 12 which may be considered to be formed within a pyramid having a polygonal base. This pyramid is defined between the points A, E, J, N and O (FIG. 2). In the preferred embodiment the pyramid base is a square 26, depicted in FIGS. 1 and 2. The reflector 12 has four faces each of which includes a pair of inclined reflecting surfaces above the base 26 that intersect at an obtuse angle to form a dihedral. All of the pairs of the reflecting surfaces intersect along a line which lies in a plane perpendicular to the pyramid base 26. Each pair of reflecting surfaces reflects light impingent thereon into a concentrated field of reflection as indicated, for example, in FIGS. 6 and 7. At least one, and preferably a plurality of secondary reflectors 14 are located within the concentrated fields of reflection of the reflecting surfaces of the primary reflector 12. The secondary reflectors 14 are oriented to return light reflected from the reflecting surfaces of the primary reflector 12 to the apex O of the pyramid. A solar energy collecting receiver 16 is located at the apex O.

The east face of the primary reflector 12 includes the pair of reflecting surfaces 30 and 32 which intersect along line 34 to form a dihedral. The line 34 is equidistant from adjacent corners J and E of the pyramid base 26.

The reflecting surfaces of the primary reflector 12 are arranged in three levels, as will hereinafter be described. The reflecting surfaces 30 and 32 are located at the level immediately above the lowest level of reflecting surfaces. The reflecting surfaces 30 and 32 are mirror image quadrilateral reflecting surfaces defined between portions of the adjacent arris lines 44 and 44c. The reflecting surfaces 30 and 32 thereby form a first dihedral at the level of reflecting surfaces immediately above the lowest level.

In a similar fashion all of the other faces of the primary reflector 12 include pairs of reflecting surfaces that intersect at the same obtuse angle. The south face of the primary reflector 12 has a first dihedral formed by the mirror image quadrilateral reflecting surfaces 30a and 32a which intersect along line 34a. The surfaces 30a and 32a are bounded by arris lines 44 and 44a that extend from the apex O of the pyramid where the receiver 16 is located to the corners E and A, respectively, of the square pyramid base 26.

Similarly, the west face of the primary reflector 12 includes mirror image quadrilateral reflecting surfaces 30b and 32b, which intersect along line 34b and which are bounded by arris lines 44a and 44b. The north face of the primary reflector 12 includes identical mirror image quadrilateral collecting surfaces 30c and 32c which intersect along line 34c and which are bounded by arris lines 44b and 44c. Arris line 44b and 44c extend from the apex O of the pyramid at which the solar energy receiver 16 is located to corners N and J, respectively, of the square pyramid base 26.

The lower edges of the dihedrals formed by the reflecting surface pairs 30–32, 30a–32a, 30b–32b, and 30c–32c, lie in a plane parallel to and spaced above the pyramid base 26. The plane containing the lower edges of the dihedrals is indicated at 17 in FIG. 2A. The plane 17 contains the points T1, E2, S1, A2, V1, N2, U1, and J2, visible in FIG. 2.

On each face of the primary reflector 12, between the plane 17 and the plane in which the base 26 of the pyramid lies, the lowest level of the reflecting surfaces is defined.

The base 27 of the primary reflector 12 preferably has at least eight sides, and in the preferred embodiment of the invention has twelve sides. The base 27 of the primary reflector 12 is inscribed within the pyramid base 26 such that the corners E, A, N, and J of the pyramid base are coincident with some of the corners of the primary reflector base 27.

Figure 1A:
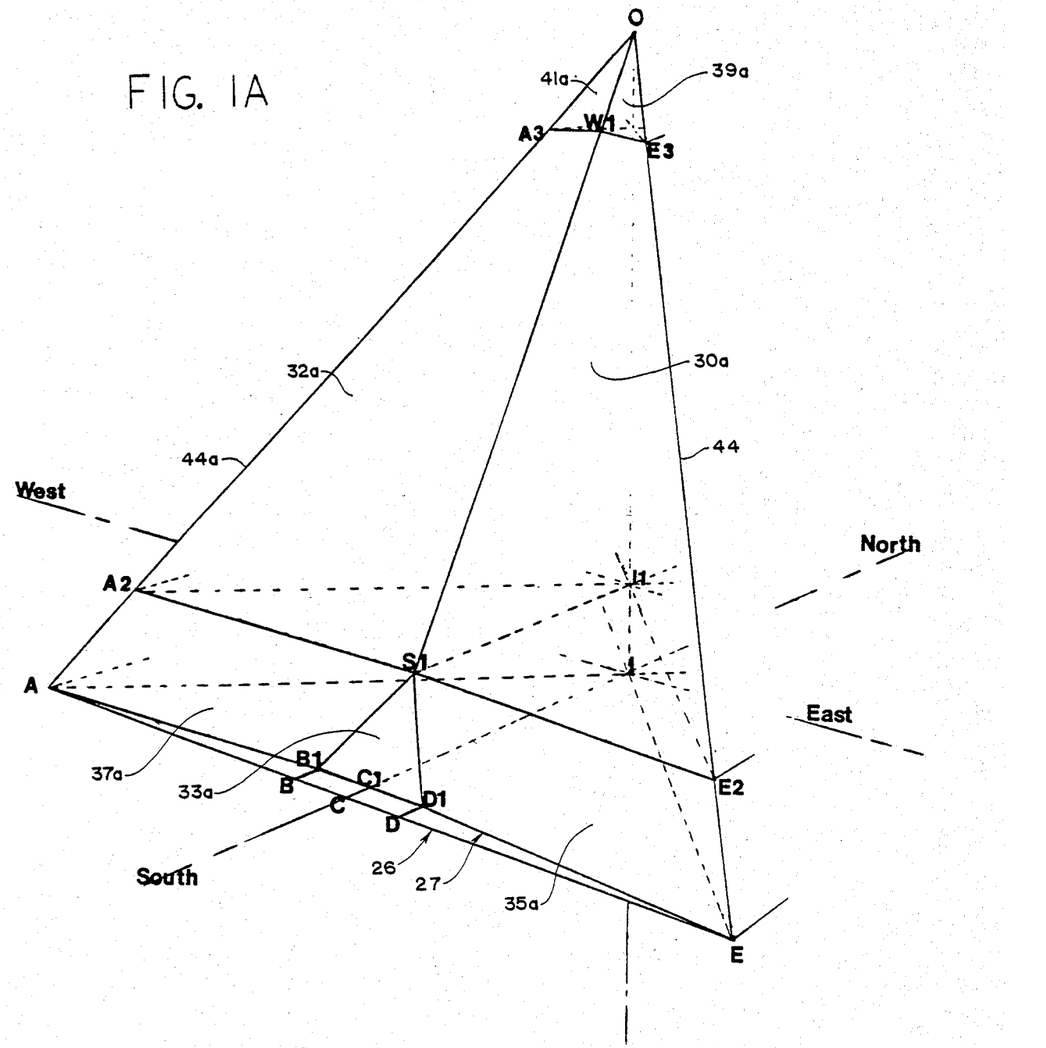
FIG. 1A is an enlarged perspective view of one face of the primary reflector of FIG. 1.
Figure 2A:
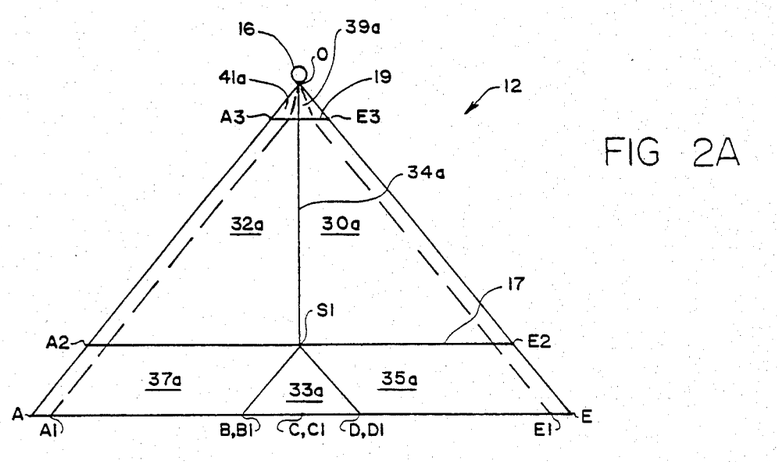
FIG. 2A is an elevational view of the primary reflector of FIGS. 1-2.
Figure 2B:
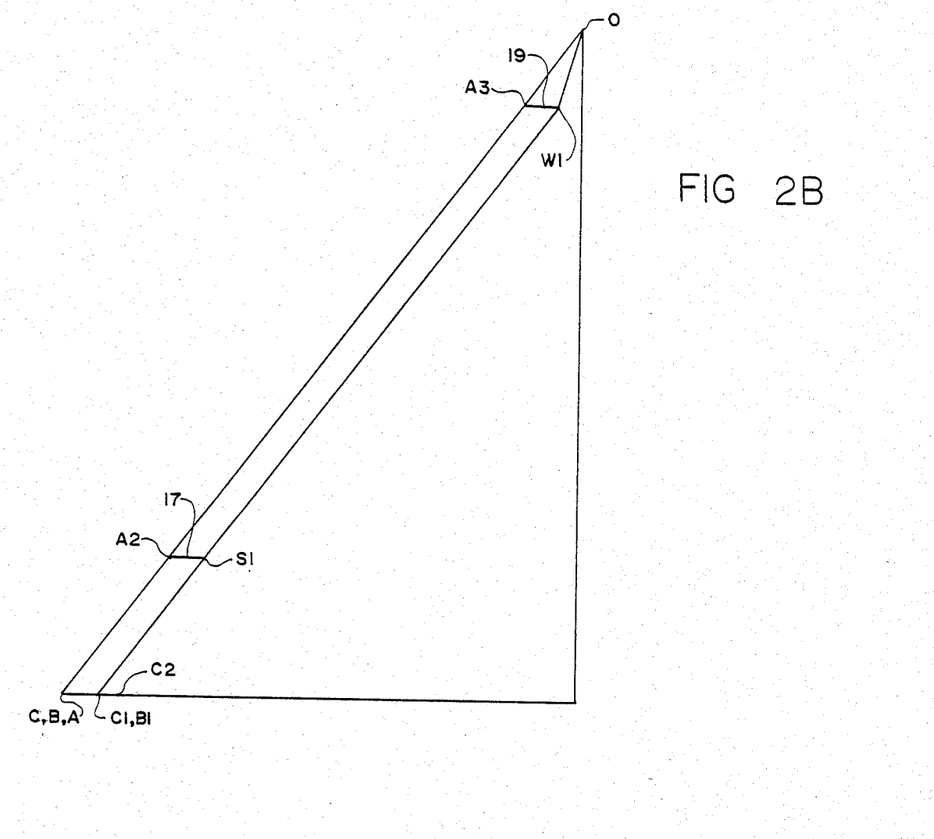
FIG. 2B is a diagrammatic, sectional elevational view taken along the lines 2B—2B of FIG. 2.

With particular reference to FIG. 2A, the lowest level of reflecting surfaces of each face of the primary reflector 12 includes an isosceles triangle. The isosceles triangle 33a is visible in FIGS. 1A, 2 and 2A and has corners B1, S1, and D1. The base of the isosceles triangle 33a forms one of the sides of the polygonal primary reflector base 27 and is defined between points B1 and D1. The center of the isosceles triangle base is indicated at C1. The base of the isosceles triangle 33a is equidistant from the adjacent corners A and E of the pyramid base 26 and is parallel to and inset from a line extending between the adjacent corners A and E and passing through the points B, C and D, most clearly visible in FIGS. 1A and 2.

The lowest level of reflecting surfaces also includes reflecting surfaces 35a and 37a, shaped as mirror image parallelograms on either side of the isosceles triangle 33a, as indicated in FIGS. 1A and 2A. The parallelogram 35a is defined by the lower edge of the dihedral, along the lower edge of the reflecting surface 30a, by the line S1-E2, visible in FIGS. 1A, 2 and 2A, by the surface of the pyramid base 26 adjacent the base of the isosceles triangle 33a, by the side S1-D1 of the isosceles triangle 33a, and by the line segment E2-E on arris line 44. Similarly, the parallelogram 37a is defined by the lower edge of reflecting surface 32a of the dihedral, along the line A2-S1, by the line A-B1 lying on the surface of the pyramid base 26, by the side B1-S1 of the isosceles triangle 33a, and by the segment A-A2 of arris line 44a.

An isosceles triangle and a pair of mirror image parallelograms are similarly formed on all of the other faces of the primary reflector 12 between plane 17 and the base plane. These reflecting surfaces are indicated at 33, 35 and 37 on the east face of the primary reflector 12 in FIG. 2. Corresponding reflecting surfaces are indicated at 33b, 35b and 37b on the west face of the primary reflector 12. Identical reflecting surfaces are indicated at 33c, 35c and 37c on the north face of the primary reflector 12 in FIG. 2.

The highest level of reflecting surfaces is defined above a plane 19, spaced a predetermined distance above the pyramid base 26 and indicated in FIG. 2A. On each of the faces of the primary reflector 12 the highest level of reflective surfaces extends upward above the plane 19 to the apex O at which the solar energy receiver 16 is located. Above the plane 19 a second dihedral is defined on each primary reflector face between portions of the arris lines defining that face. For example, and with reference to FIG. 2A, reflecting surfaces 39a and 41a form a second dihedral. The reflecting surfaces 39a and 41a lie in planes forming greater angles with the polygonal base 26 than do the planes in which the reflecting surfaces 30a and 32a of the first dihedral lie. The reflecting surface 39a is a triangular surface defined between the points E3, W1 and O, as depicted in FIGS. 1A, 2 and 2A. Similarly, the reflecting surface 41a of the second dihedral is formed between the points A3, O and W1. Identical second dihedrals are formed on the east face of the primary reflector 12 by reflecting surfaces 39 and 41. Likewise, surfaces 39b and 41b form a second dihedral on the west face of the primary reflector 12. On the north face surfaces 39c and 41c form a second dihedral.

From the foregoing description of the geometric configuration of the primary reflector 12, it is apparent that the primary reflector 12 is shaped generally as a pyramid, though having slight but very significant distinctions from a true pyramid having a square base. Specifically, the faces of the primary reflector 12 are not isosceles triangles. With reference to the south face, for ease of description, reflecting surfaces 30a and 32a are not coplaner, but intersect at an obtuse angle to form a dihedral. Preferably, the sine of one half the preferred obtuse angle is about 0.999952043.

Another distinction from a true pyramid structure is that the surfaces 30a and 32a do not extend from the base of the primary reflector 12 to the apex O. The line of intersection 34a of the reflecting surfaces 30a and 32a, if extended, would intersect the base 26 at point C2, indicated in FIG. 2. In fact, however, the reflecting surfaces 30a and 32a do not extend to the base 26 of the pyramid within which the primary reflector 12 is inscribed. Rather, they extend only between the planes 17 and 19 which delineate the levels of reflecting surfaces. Preferably, the ratio of the distance of separation of the plane 17 from the base 26, relative to the distance between the adjacent pyramid base corners A and E is about 0.1273:1. Preferably also, the ratio of the distance of separation of the plane 19 from the base 26, relative to the distance between the pyramid base corners A and E is about 0.5729:1. The ratio of the length of the base B1-D1 of the isosceles triangular shaped reflecting surface 33a to the distance between the adjacent pyramid base corners A and E is preferably about 0.2000:1.

A further modification of the primary reflector 12 from the geometry of a true pyramid is that the reflecting surfaces of the highest level above the plane 19 lie in planes forming greater angles with the pyramid base 26 than do the reflecting surfaces 30a and 32a. The arris lines 44, 44a, 44b and 44c are straight lines, however, from the apex O to the corners E, A, N and J, respectively, of the square pyramid base 26.

The ratio of the vertical height of the pyramid that is the distance between the apex O and the base 26, to the distance between adjacent corners A and E of the base 26 is about 0.6366:1. The ratio of the pyramid arris lines 44, 44a, 44b and 44c to the distance between adjacent corners, that is the length of one of the sides of the square 26, is about 0.9514:1.

The following Table I gives preferred measurements in inches of distances between points illustrated with respect to the primary reflector 12 in FIGS. 1A-2B. While the pyramid 12 and secondary reflectors 14 and 14' be virtually any size, the pyramid proportions and the proportional inclination of the secondary reflectors 14 and 14' therefrom should be proportional to the preferred embodiment illustrated, at least for the latitude and longitude at which the primary reflector 12 is to be used. Table I provides dimensions for a primary reflector 12 which is to be used at latitude of about 29°, 58', 51"N and a longitude of 31°, 9', 00"E. This is approximately the latitude and longitude of The Great Pyramid of Egypt, and the measurements given in Table I correspond to measurements of The Great Pyramid of Egypt.

TABLE I

| LINE SEGMENT | LENGTH (inches) |
| --- | --- |
| O-W1, O-X1, O-Y1, O-Z1 | 717.61815 |
| O-A3, O-E3, O-N3, O-J3 | 868.78811 |
| A3-A2, E3-E2, J3-J2, N3-N2 | 6081.3348 |
| W1-S1, X1-T1, Y1-U1, Z1-V1 | 5173.98846 |
| A2-A, E2-E, J2-J, N2-N S1-B1, S1-D1, T1-F1, T1-H1 U1-K1, U1-M1, V1-R1, V1-P1 | 1737.75824 |
| A-B1, D1-E, E-F1, H1-J, J-K1 M1-N, N-P1, R1-A, A2-S1, S1-E2 E2-T1, T1-J2, J2-U1, U1-N2, N2-V1, V1-A2 | 3652.4246 |
| B1-D1, F1-H1, K1-M1, P1-R1 B-D, F-H, K-M, P-R | 1826.5624 |
| E-D, B-A, A-R, P-N, N-M, K-J J-H, F-E | 3652.2496 |
| D-C, C-B, R-Q, Q-P, M-L, L-K H-G, G-F | 913.2812 |
| A1-B1, D1-E1, E1-F1, H1-J1, J1-K1, M1-N1, N1-P1, R1-A1 | 3616.4868 |
| B1-C2, C2-D1, F1-G2, G2-H1, K1-L2, L2-M1, P1-Q2, Q2-R1 | 913.325 |
| C-C1, G-G1, L-L1, Q-Q1 | 35.7628 |
| A-E, E-J, J-N, N-A | 9131.0616 |
| A1-E1, E1-J1, J1-N1, N1-A1 | 9059.536 |
| A2-E2, E2-J2, J2-N2, N2-A2 | 7304.4992 |
| S1-U1, V1-T1 | 7232.9736 |
| S1-C1, T1-G1, U1-L1, V1-Q1 | 1478.41852 |
| W1-Y1, X1-Z1 | 841.58 |
| E3-J3, J3-N3, N3-A3, A3-E3 | 913.106 |
| A3-W1, W1-E3, E3-X1, X1-J3 J3-Y1, Y1-N3, N3-Z1, Z1-A3 | 457.951564 |
| C1-C2, G1-G2, L1-L2, Q1-Q2 | 8.9411 |

In addition to the measurements suggested in Table I, plane 17 is preferably 1162.6 inches above the plane of bases 26 and 27, plane 19 is preferably 5231.7129 inches above the plane of bases 26 and 27, and the apex O is preferably 5813.0143 inches above the bases 26 and 27.

While it is entirely feasible to employ a structure in which only one of the primary reflector faces contains reflecting surfaces, for the maximum collection of solar energy, all of the four faces of the primary reflector 12 contain reflecting surfaces formed in the geometry described. The reflecting surfaces are preferably mirrored by silvering material on the outer surface.

A single one of the stationary secondary reflectors 14 is illustrated in FIGS. 3 and 3A. Many of the stationary secondary reflectors 14 are depicted only by location for simplicity of illustration in FIG. 1. However, the precise placement of the stationary secondary reflectors 14 is not critical as long as they are located within the area of reflected light from the pairs of reflecting surfaces of the primary reflector 12 at some time during the solar year. Also the desired positions for the secondary reflectors 14 will depend upon the latitude and longitude at which the primary reflector 12 is located. While the secondary reflectors 14 are preferably located in stationary disposition, they may be moved about, depending upon the solar season, and manipulated for purposes of positional adjustment and cleaning.

With reference to FIGS. 3 and 3A, each secondary reflector 14 is preferably formed of a mosaic of reflectors 50, each formed in miniature in the same manner as each face of the primary reflector 12. That is, each reflector 50 includes central, mirror image trapezoidal reflector surfaces. At the major bases of these mirror image trapezoidal surfaces are reflecting surfaces in the form of mirror image parallelograms, with an isosceies triangularly shaped reflecting surface located therebetween. A smaller second dihedral is located adjacent to the minor bases of the trapezoidal shaped reflectors. All reflecting surfaces of the mosaic sections 50 are mirrored or silvered on the sides 52 thereof which face toward the pyramid apex O. By using a mosaic of reflecting surfaces encompassed within a face of the type heretofor described, a significant concentration of reflected light is achieved as the light is reflected from the secondary reflectors 14 back to the solar energy receiver 16 at the apex O of the primary reflector 12. Alternatively, a single toroidal sheet of mirrored glass might be utilized in each of the stationary secondary reflectors 14. In any event, the reflector 14 is curved at a radius of curvature equal to twice its distance from the apex O, as illustrated in FIGS. 3A and 3B, so as to continually focus light on the apex O.

The mosaic of reflector sections 50 are supported from behind by and secured to a planer metal backing plate 54. The backing plate 54 has an out-turned lip 56 at the foot thereof. Together the metal backing plate 54 and the lip 56 support the mosaic of silver glass sections 50 both from beneath and from behind. The backing plate 54 is joined to horizontal bases 58 at a hinge 60. Telescoping, arcuate rear supports 62 and 64 include adjustable fasteners 66 which can lock the angle of the mosaic of mirror sections 50 relative to the horizontal base 58 indicated in FIG. 3.

Each of the stationary secondary reflectors 14, once positioned at a distance from the base 27 of the primary reflector 12, is oriented at a specific angle relative to the horizontal. This angle may be selected empirically by an observer at the apex O or from records obtained using a proportional model of the primary reflector 12. The secondary reflectors 14 are located at varying distances from the primary reflector 12. A mosaic of mirrored glass sections 50 of each secondary reflector 14 is inclined from the horizontal base 58 thereof at an angle that increases with a line joining the closest adjacent corners of the square pyramid base 26. Moreover, the secondary reflectors 14 are preferably mounted at an elevation that increases with distance from a line joining the closest adjacent corners of the square pyramid base 26 within which the base 27 of the primary reflector 12 lies.

Preferably, included among the secondary reflectors 14 are a number of secondary reflectors which are located adjacent the base of the primary reflector 12 at an elevation below the grade of the base 27 of the primary reflector 12. The distance below grade may be achieved in commercial embodiments of the invention by excavation. Those secondary reflectors 14 which are located adjacent the base 27 of the primary reflector 12 should be located below grade a distance indicated at 70 in FIG. 4. The ratio of the distance 70 to the length of a side of the square 26 is about 0.00398:1. Also as indicated in FIG. 4 it is preferable for the secondary reflectors 14 furthest from the base 27 to be mounted at a vertical elevation above the base 27, such as on a stadium or coliseum type framework 72.

FIG. 4 is a diagrammatic elevational indicating one arrangement for positioning of the secondary reflectors 14 according to the invention. The stadium framework 72 is preferably of an arcuate configuration facing the south side of the primary reflector 12. The highest elevation of stadium framework 72 is directly south of the primary reflector 12, and the walls of the framework 72 decrease in height both toward the east and west of the primary reflector 12. The stadium framework 72 may include a number of horizontal ledges or tiers which follow the contour of the inner surface of the framework 72 in order to provide support for the bases 58 of the secondary reflectors 14. Such ledges have not been shown in FIG. 4 in order to allow better illustration of the reflection patterns in that figure, hereinafter to be described. For this same reason, the secondary reflectors 14 are indicated only by position and orientation relative to the pyramid apex O.

While only the secondary reflectors 14 directly south of the primary reflector 12 have been depicted in FIG. 4, it must be understood that secondary reflectors 14 are arranged at spaced intervals in arcuately spaced disposition on the horizontal tiers about the inner face of the stadium framework 72. All of the mirrored glass mosaic panels 50 are oriented to reflect light received from the primary reflector 12 back to the apex O. The secondary reflectors 14 on the stadium framework 72 are arranged in arcuately spaced disposition as indicated in FIG. 1, but at elevations lying above the base 27 of the primary reflector 12. The purpose of arranging the secondary reflectors 14 in the stadium arrangement as indicated in FIG. 4 is to reduce the required area of land about the primary reflector 12 which is necessary to accomodate the secondary reflectors 14, yet to reflect as much light as possible from the reflecting surfaces of the primary reflector 12 back to the apex O. In FIG. 4, a shaft of light 73 is illustrated which strikes the primary reflector 12. The angle of the shaft of light 73 relative to the plane of the pyramid base 27 is approximately 83° at noon on the summer solstice at a latitude of 29°, 58′, 51″N and a longitude of 31°, 9′, 00″E. The reflection from the southerly facing sides of the primary reflector 12 from the shaft of light 73 lies within the pattern 84, the highest ray of which is indicated at 77 in FIG. 4. The pattern of illumination 84 is the most concentrated light reflection pattern projected to the south from the south face of the primary reflector 12 during the year. The uppermost secondary reflectors 14 on the stadium framework 72 depicted in FIG. 4 do not receive light from the primary reflector 12 at noon on the summer solstice, and hence do not contribute significantly to the collection of solar energy at that time.

However, as the apparent elevation of the sun drops in the sky, as with the changing of the seasons, the reflected beams in the pattern of illumination reflected to the south by the primary reflector 12 rise to increasing angles of inclination, as at each successive solar noon as the winter solstice approaches. At noon on the winter solstice, a shaft of light striking the primary reflector 12 and indicated at 79 in FIG. 4 results in a reflected beam 81, which is well above the horizontal. The lowest rays of beam 81, indicated at 77′, strike the uppermost secondary reflectors 14 on the stadium framework 72, even on the winter solstice. The angle of the beam 81 relative to the horizontal lies at an angle to the horizontal only slightly less than the impinging light shaft 79. However, the structure of the primary reflector 12 is such that at no time does the angle of reflected illumination relative to the horizontal exceed the angle of incidence of light producing that illumination. The upper edge of the stadium framework 72 is constructed low enough so that direct sunlight toward the primary reflector 12 will pass over the upper edge of the stadium framework 72 during the height of the solar day so that the framework 72 does not cast a shadow on the primary reflector 12.

Because the several tiers of secondary reflectors 14 are arranged in the stadium framework 73 well above the plane of the base 27 of the primary reflector 12, reflected illumination directed outwardly from the primary reflector 12 at angles slightly below the horizontal can be intercepted before reaching the plane of the base 27. This allows the space requirements for the system 10 to be foreshortened by reducing the land area within which light is received by the secondary reflectors 14 and returned to the apex O.

Furthermore, the arrangement of secondary reflectors 14 in tiers above the apex O allows beams of light reflected southward and above the horizontal from the primary reflector 12 to be intercepted and returned to the collector 16. In the absence of secondary reflectors 14 located at vertical elevations, as indicated in FIG. 4, no light reflected from the southern sides of the primary reflector 12 could be captured except during the period between about April 21, and August 22, at the aforesaid latitude. By employing secondary reflectors 14 above the level of the apex O, at least some light can be collected from the reflections from the southern sides of the primary reflector 12 and returned to the apex O throughout the solar year.

The curvature of the upper edge 75 of the stadium framework 72 allows maximum collection of light at noon time, while preventing the stadium framework 73 from casting a shadow when the sun is lower in the sky at earlier and later hours in the solar day.

If desired, a stadium framework 72 can be positioned to collect and reflect light from the east, west and north sides of the primary reflector 12, in order to further reduce the space requirements and maximize solar energy collection of the system.

In the embodiment of the invention depicted in FIG. 4, those secondary reflectors 14 at zero elevation, that is in the plane of the base 27 of the primary reflector 12, are located at a distance equal to about $2\frac{1}{2}$ times the length of a side of the square 26. The upper edge 75 at the highest point of the stadium framework 72 lies at an angle of about 35° when viewed from the south side of the square 26.

Figure 5:
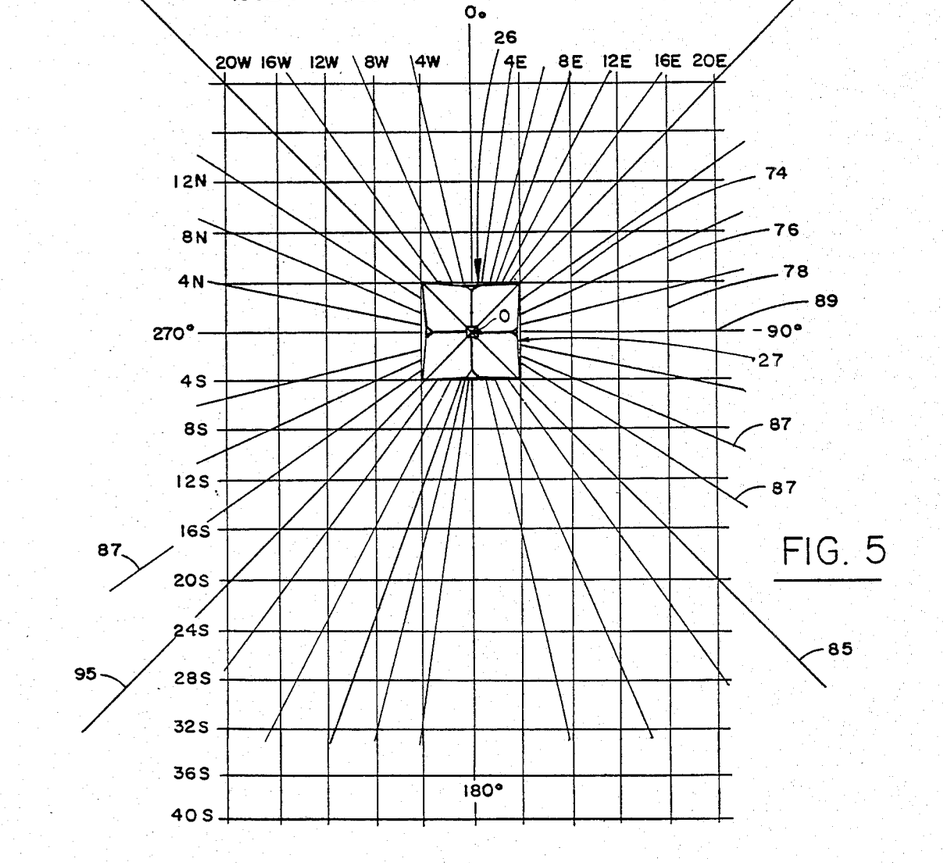
FIG. 5 is a plan diagram useful in explaining the positioning of the secondary reflectors of the invention.

As previously noted, the elevation at which the stationary secondary reflectors 14 are mounted increases with distance from the closest side of the square pyramid base 26, although the relationship is not proportional. Therefore, and as depicted in the gridwork of FIG. 5, all of the secondary reflectors 14 which are located at a distance from the square pyramid base 26 indicated by the concentric square 74 are uniformly adjusted in angle of inclination as well as elevation of mounting. Likewise, all of the secondary reflectors 14 located on the perimeter of the surrounding concentric square indicated at 76 are likewise adjusted at a uniform angle of inclination and mounting elevation, both of which are greater than the corresponding angle of inclination and elevation of secondary reflectors on the perimeter of the square 74. Similarly, all secondary reflectors 14 on the perimeter of the square 78 have a uniform angle of incidence and elevation. The same is true of the secondary reflectors 14 on the portion of the square indicated at 89 in FIG. 5.

In addition to the inclination of each mirrored glass 50 from the horizontal, the hinge 60 of each secondary reflector 14 is located perpendicular to the one of the rays 87 along which it is mounted. The rays 87 are radial lines emanating from the center of the base 27 which lies directly beneath the apex O of the primary reflector 12.

Rectilinear coordinate positions in the coordinate system of FIG. 5 for an array of secondary reflectors 14 in one simple embodiment of the invention designed to return a large amount of light to the apex O of the primary reflector 12 are set forth in Appendix 1 hereto. The embodiment of FIG. 5 and Appendix 1 is a much simpler form of the invention and does not employ the stadium framework of FIG. 4. The units of length employed in Appendix 1 are arbitrary, as long as the proper proportioning of spacing of the secondary reflectors 14 and the dimensions of the pyramid 12 are maintained. With respect to Appendix 1 the length of each side of the square 26 may be considered to be 8 units. Preferably, additional secondary reflectors should be located along the rays 87 at five compass degree increments. These additional secondary reflectors 14 should be within quadrants defined between diagonals 85 and 95 and, at radial distances from the projection of the apex O onto the base 27 equal to the radial distances of secondary reflectors 14 set forth in Appendix 1 which are in the same quadrants.

Figure 4B:
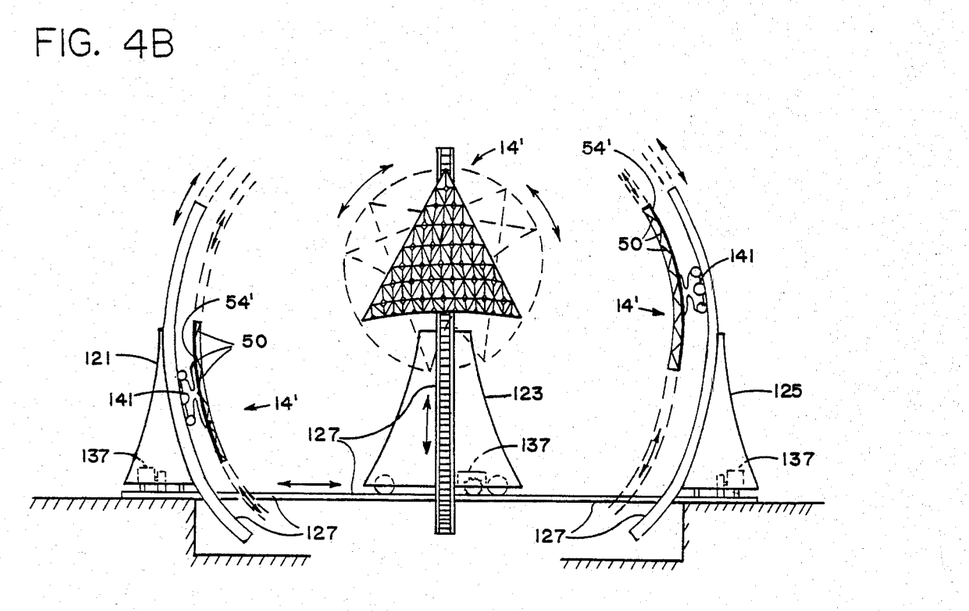
FIG. 4B is a diagrammatic elevational view taken along the lines 4B—4B of FIG. 4A.
Figure 4C:
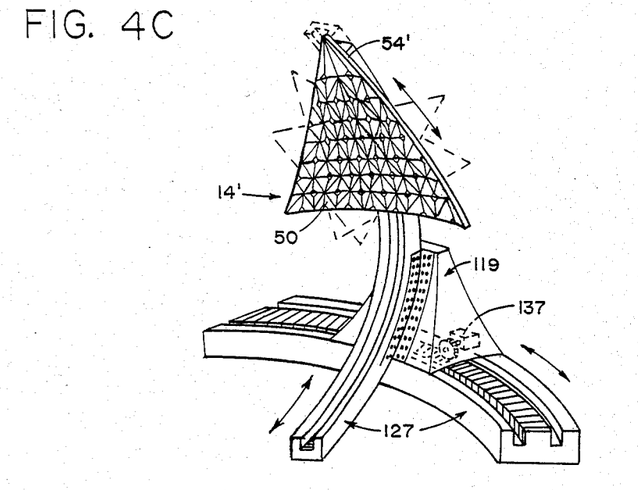
FIG. 4C is an isometric detail of a single secondary reflector in FIGS. 4A and 4B.

While stationary secondary reflectors 14 may be employed, one or a plurality of secondary reflectors 14' may be mounted in mobile fashion and utilized. One such arrangement for moveably mounted reflectors 14' is depicted in FIGS. 4A, 4B and 4C. In this embodiment, four carriages, 119, 121, 123 and 125 are depicted. Each carriage carries a mosaic of mirrored glass sections 50 on a backing 54'. Interstices exist between the glass sections 50 and the backing 54' is not continuous so that air can pass through the secondary reflectors 14' and thereby aleviate any problem of wind resistance. The backing 54' is of arcuate shape and is engaged with its associated carriage by means of a rack and pinion drive, or other conventional mechanical coupling, to move in a spherical arc about the apex O of the primary reflector 12. Each secondary reflector 14' is curved at a radius of curveture equal to twice its distance from the apex O, as illustrated in FIG. 4B, so as to continuously focus light on the apex O. That is, the backing 54', while remaining mounted upon an associated carriage 119, 121, 123, or 125, can be driven in an arcuate path so that the elevation and bearing of the mirror on the secondary reflector 14' is varied in order to track the azimuth and zenith of reflection from the primary reflector 12. The coupling of the backing 54' to the carriage can also be arranged to vary the orientation of the mosaic of mirrored glass sections 50 relative to the arcuate paths of movement of the carriages and the backings 54' so as to capture a greater portion of the light reflected from the primary reflector 12. The directions of movement of the reflector backings 54' relative to the carriages 119, 121, 123 and 125 are indicated by directional arrows in FIG. 4A and in FIG. 4B. The carriages 119, 121, 123 and 125 can be propelled along the track 127. The carriage 119 maintains the secondary reflector 14' associated therewith within the field of reflection from the east face of the primary reflector 12. The carriage 121 maintains the secondary reflector 14' within the field of reflection from the south face while the carriage 123 maintains the secondary reflector 14' within the field of reflection from the west face. The carriage 125 maintains the secondary reflector 14' within the field of reflection from the north face of the primary reflector 12. The track 127 is positioned in optimum distance from the primary reflector 12, depending upon the size of the secondary reflectors 14', in order to intercept as much reflected light from the primary reflector 12 as possible.

Figure 17:
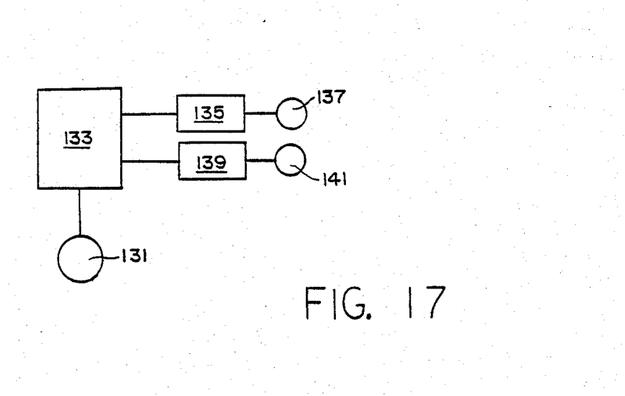
FIG. 17 is a diagrammatic illustration of the control system for the mobile secondary reflectors of FIGS. 4A, 4B and 4C.

The embodiment of FIGS. 4A, 4B and 4C includes an electronic tracking system, depicted in FIG. 17, for positioning the secondary reflectors 14' to track both the azimuth and the zenith of light reflected from each of the faces of the primary reflector 12. With reference to FIG. 17, a clock 131 is electrically connected as an input to a computer 133. The clock 131 signals the time of solar day and the date of the solar year. The computer 133 is programmed to provide outputs in accordance with the latitude and longitude at which the primary reflector 12 is located. The computer 133 provides an azimuth tracking output to a transducer 135. The transducer 135 includes a comparator which compares the azimuth positions of the carriages 119, 121, 123 and 125 to the positions of the centers of the concentrated fields of reflection from the four faces of the primary reflector 12. The transducer 135 thereupon operates servomotors, indicated collectively at 137 in FIG. 17, and in FIGS. 4B and 4C to drive the carriages upon the track 127 to position the mobile secondary collectors 14' to receive the reflected solar energy from the several faces of the primary reflector 12. That is, for example, the mobile secondary reflectors 14' are driven about the track 127 to intercept the patterns of reflection depicted and described in association with FIGS. 6-16.

Concurrently, the computer 133 provides zenith outputs to a zenith transducer 139. The zenith transducer 139, in turn, operates servomotors indicated collectively at 141 to drive the mirror backings 54' relative to the carriages 119, 121, 123 and 125, in arcuate paths centered upon the apex O. The zenith servomotors 141 increase and decrease the elevation of the backings 54' through a rack and pinion drive, for example. The focus of the mobile secondary reflectors 14' remains fixed upon the apex O regardless of the elevation of the backings 54'. As controlled by the system of FIG. 17, the mobile secondary reflectors 14' are maintained within the paths of movement of the concentrated fields of reflection. The secondary reflectors 14' are mounted in mobile fashion and are driven by the servomotors 137 and 141, under the control of the computer 133, to move on the track 127. The computer 133 also moves the mirrors relative to the carriages upon which they are mounted so as to continually intercept the concentrated light reflected from the primary reflector 12, and to return that reflected light to the solar energy receiver 16 at the apex O of the primary reflector 12.

To further maximize the use of the four mobile secondary mirrors 14' and their carriages 119, 121, 123, and 125 of the embodiment of FIGS. 4A, 4B and 4C, the electronic tracking system depicted in FIG. 17 positions the carriages and elevates their associated secondary mirrors to avoid shadows of the primary receiver 12. The secondary reflectors 14' then receive the optimum direct rays of the sun and focus these light rays on the solar energy receiver 16 at the apex O of the primary reflector 12. Utilizing the mobile secondary reflectors 14' in this manner during the time shadows are present avoids the total loss of available light due to shadows, thereby making the system even more effective in light collection.

The solar energy collector 16 may be any solar receiver which will accomodate the temperatures developed by the solar energy reflected thereto. The heat transport fluid circulates through the collector 16 by means of fluid lines 18 and 20, illustrated in FIG. 1, which extend the vertical height of the primary reflector 12 to drive electrical generators 22. Electrical power is extracted from the generators 22 on electrical lines indicated diagramatically at 24. In place of the thermal collector 16, an optical collector may be desireable. In such an arrangement the optical collector would not convert visible light directly to heat, but instead would reflect light received at the apex O to one or more thermal collectors or solar voltaic generators. Such a tertiary reflecting arrangement can also be used to beam the reflected solar energy to a location outside of the primary reflector if desired.

The patterns of solar reflection from each pair of reflecting faces of the primary reflector 12 will vary with geographic latitude, longitude with time of day, and with time of the solar year. However, there will be a pattern of reflection in a triangular shape from at least one pair of reflecting surfaces throughout the time that the sun is significantly elevated above the horizon.

The diagrams of FIGS. 6–16 are useful in explaining the pattern of concentrated solar reflection which occur with the primary reflector 12 according to the invention. The illustrations FIGS. 6–16 accurately depict the pattern of reflections from a primary reflector 12 only at a latitude of 29°, 58', 51"N, and at a longitude of 31°, 9', 00"E, north, however. Opposite sides of the square pyramid base 26 within which the primary reflector 12 is constructed respectively face the true north and true south poles of the earth.

Figures 7, 8, 9, 10:
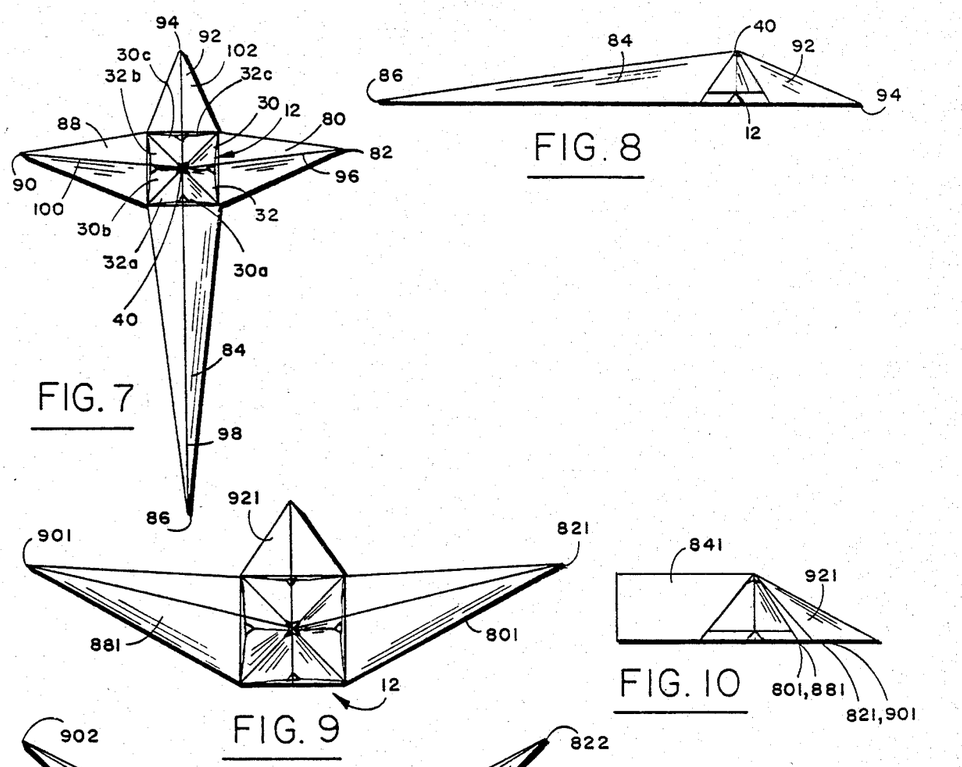
FIG. 7 illustrates in plan view the patterns of solar reflection at noon on the summer solstice for a primary reflector located at latitude 29°, 58', 51" North and longitude 31°, 9', 00" East.
FIG. 8 is a side elevational view of the pattern of reflection of FIG. 7.
FIGS. 9-16 are illustrative of variations of the reflection patterns of the primary reflector of FIGS. 7 and 8 throughout a solar year.

The illustration of FIG. 7 depicts the pattern of reflections which such a primary reflector will project upon level terrain from solar illumination at solar noon on the summer solstice. At this time the several reflecting surfaces 30, 32, 33, 35, 37, 39 and 41 on the east face of the primary reflector 12 cast a triangular pattern of reflection at 80. The triangular pattern 80 extends from the base 27 of the primary reflector 12 eastward with the limit of reflection lying at a point 82.

Similarly, the pattern of reflection from the surfaces of the south face of the primary reflector 12 is indicated at 84. This pattern is a longer triangular shaped patter extending southward from the base of the primary reflector 12 to the point 86. The pattern of reflection from the reflecting surfaces of the west face of the primary reflector 12 is indicated at 88 and is a triangular pattern extending from the west side of the base of the primary reflector 12 westward to the point 90. At the same time, there is a reflection from the reflecting surfaces of the north face of the primary reflector 12 which creates a pattern indicated at 92 extending northward from the base of the north side of the primary reflector 12 and converging to the point 94.

It is to be understood that the patterns depicted in FIG. 7 are patterns of illumination from reflections, not shadows. Because the incident solar light is reflected over relatively confined regions, indicated at 80, 84, 88 and 92, the intensity of reflection within these regions is quite high. Moreover, there is a double reflection of extremely high illumination that extends from the center of the nearest side of the base of the primary reflector 12 to the apex of each triangular shaped reflection pattern. That is, there is a region of high intensity of reflection within each of the patterns 80, 84, 88 and 92 that extends a short distance approximately on either side of the lines 96, 98, 100 and 102, indicated in FIG. 7. This high intensity region of reflection occurs because each of the patterns 80, 84, 88 and 92 results from the reflections of at least two separate reflecting faces which intersect in a dihedral angle, as previously described.

At noon on the summer solstice any and all secondary reflectors 14 or 14' located within the areas 80, 84, 88 and 92 will return incident reflected solar light thereon to the apex O of the primary reflector 12. Accordingly, at that particular point in time the only secondary reflectors 14 or 14' which receive reflected light from the primary reflector 12 and return that reflected light to the collector 16 lie within the areas 80, 84, 88 and 92. Because the light reflected from the reflecting faces of the primary reflector 12 is concentrated in such small regions, a very large amount of light energy can be collected and concentrated from a relatively small number of secondary reflectors located within the areas 80, 84, 88 and 92. It must be considered, however, that the reflection pattern of FIG. 7 from the primary reflector 12 depicted therein appears for only a brief instant each year. However, the areas traversed by at least some of the reflection patterns from the reflecting surfaces of at least some of the faces of the primary reflector 12 remain relatively compact throughout the solar day, and even throughout the solar year. Accordingly, an array of stationary secondary collectors 14 as depicted in FIG. 1, or mobile secondary collectors 14' as depicted in FIGS. 4A and 4B, will be highly effective in accumulating and concentrating solar energy in a collector 16 as depicted therein, throughout the solar days and throughout a solar year.

Figure 6:
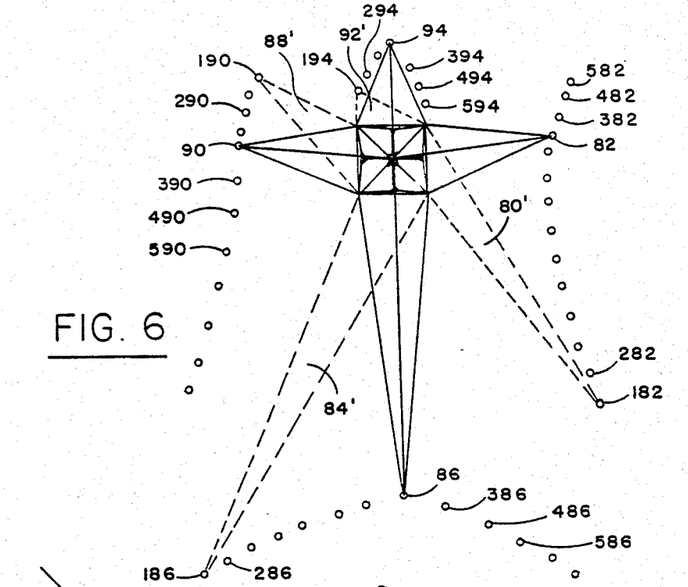
FIG. 6 is a diagram useful in explaining the pattern of solar reflection from the primary reflector of the invention throughout a single solar day.

FIG. 6 is useful in describing the patterns of reflection achieved throughout the day during summer solstice from the primary reflector 12. Early in that day the pattern of reflection from the east side of the primary reflector 12 is indicated at 80'. Also early in the day the pattern of reflection from the south side of the primary reflector 12 is indicated at 84'. The earliest pattern of reflection from the west side of the primary reflector 12 is indicated at 88'. The pattern of reflection from the north side of the primary reflector 12 early in the day is indicated at 92'. As the day progresses, the apices of the triangular shaped areas of reflection advance as indicated. That is, the apex of the area of reflection from the south face proceeds from 186 to 286 until it reaches the point 86 indicated in FIG. 6 and in FIG. 7 at noon on the summer solstice. As the day advances so does the apex of the reflection pattern to 386, 486, 586 and so forth in FIG. 6. Similar movement of the apex of each pattern of reflection may be observed on the summer solstice with respect to reflections from each of the other faces of the primary reflector 12, as indicated in FIG. 6.

The reflection patterns at noon on the summer solstice as indicated in FIG. 7 depict the condition in which the apices of the east and west patterns 80 and 88 lie closest to the primary reflector 12 and thus the concentration of reflected light within the areas 80 and 88 is maximized at that time. Likewise, the point 86 at the apex of the pattern 84 is closest to the base of the primary reflector 12 so that intensity of reflection in the area 84 is likewise concentrated. The reflection pattern 92 from the north side of the pyramid 12 is at its largest, and the point 94 is furthest from the north side of the primary reflector 12 at that time. However, because the north side of the primary reflector 12 lies within the penumbra or umbra of the primary reflector 12 for so much of the year, the reflection pattern of FIG. 7 represents the maximum concentration of reflected solar energy for the primary reflector 12, even with respect to the north side thereof.

On days both before and after the summer solstice the reflection patterns change. FIGS. 9 and 10 illustrate the reflection patterns of the north, east and west faces of the primary reflector 12 at noon midway between the vernal equinox and the summer solstice and midway between the summer solstice and autumnal equinox. At noon on these days, April 21 and August 22, the reflection from the north side of the primary reflector is indicated at 921. The east and west reflection patterns are indicated at 801 and 881, respectively in FIG. 9. The extreme limits of the patterns 801 and 881 are indicated at points 821 and 901, respectively. These points lie further north from the primary reflector 12 with respect to the corresponding points 82 and 90 at noon on the summer solstice.

As indicated at FIG. 10, the reflection pattern from the south face of the primary reflector 12 is a horizontal swath, indicated at 841. Because the extreme southern-most tip of the pattern of reflection from the south side of the primary reflector 12 advances southward so rapidly, it is highly advantageous for the secondary reflectors 14 or 14' to vary in elevation with increasing distance from the primary reflector 12, as indicated in FIG. 4 and as described in association with FIGS. 4A, 4B and 4C. An increase in elevation of the secondary reflectors 14 with distance from the primary reflector 12 allows the reflected rays from the primary reflector 12 to be intercepted before reaching the outer limits of the associated reflection pattern. This reduces the space requirement for the array of secondary reflectors 14.

In the embodiment of the invention depicted in FIGS. 4A and 4B the metal backing plates 54' are curved, so that the mosaics of mirrored glass sections 50 intercept the reflected light from the primary reflector 12 over large portions of the reflection patterns of the primary reflector faces. The curvature of each metal backing plate 54 orients the glass sections 50 to focus the reflected light impingent thereon to the solar receiver 16 at the pyramid apex O. As previously explained, the elevation of the secondary reflectors 14' relative to the carriages 121 and 125 can be varied so as to intercept the greatest portion of the reflected pattern of light as that pattern changes throughout a solar day and throughout the solar year.

Figures 11, 12, 13, 14, 15, 16:
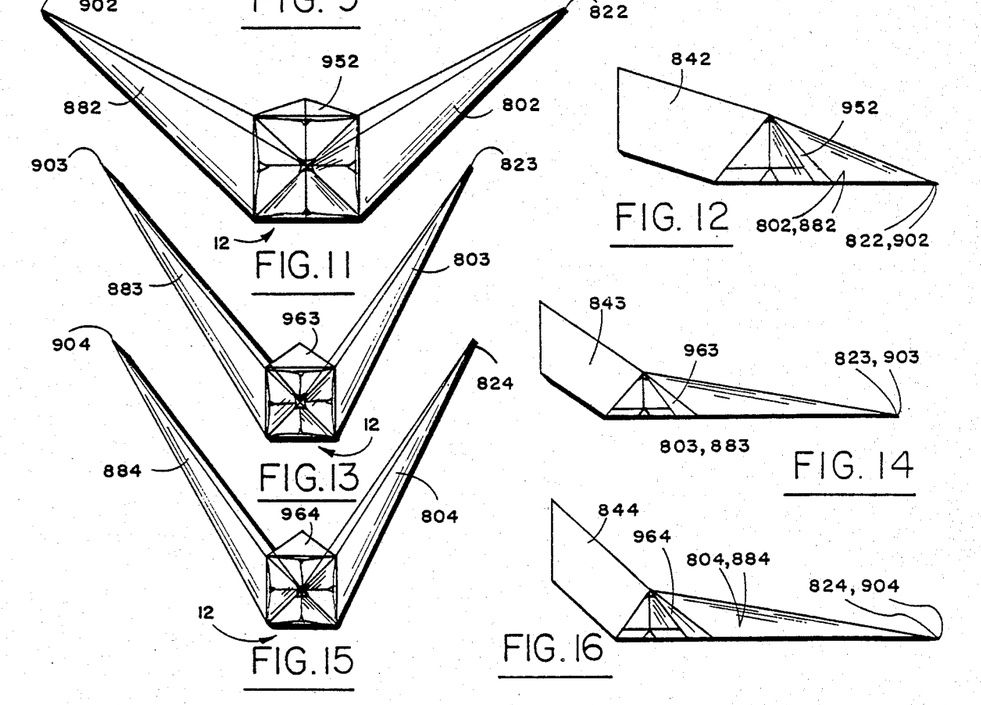

FIGS. 11 and 12 illustrate the reflection patterns of the north, east and west sides of the primary reflector 12 at 952, 802 and 882 respectively at noon on the vernal and autumnal equinoxes. As is also apparent in FIG. 12, the reflection pattern 842 from the south side of the primary reflector 12 rises above the horizontal. With stationary secondary reflectors 14 it is quite difficult to re-reflect energy from the pattern 842, since placement of mirrors above the elevation of the apex O of the primary reflector 12 is difficult. Accordingly, it may be practical to employ secondary reflectors to return reflected solar radiation from the south face to the apex O of the primary reflector 12 only between the period midway between the vernal equinox and summer solstice and midway between the summer solstice and the autumnal equinox, the conditions depicted in FIGS. 7-10.

The reflection patterns from the east and west sides of the primary reflector 12 are indicated at 803 and 833, respectively, in FIG. 13 at noon on about December 2 or 3 and at noon on about January 11 or 12. At this time the north side of the primary reflector becomes enveloped in shadow by the umbra 963. The apices of the patterns 803 and 883, indicated at 823 and 903, respectively, are somewhat north of the primary reflector 12, but the patterns 803 and 883 are still relatively compact. As illustrated in FIG. 14, the pattern of reflection from the south side of the primary reflector 12, indicated at 843, is well above the horizontal, and is lower than the sun's declination.

The east and west reflection patterns 804 and 884 indicated in FIG. 15 correspond to the reflection patterns appearing at noon on the winter solstice. Although the apices of these patterns, 824 and 904, respectively, are well north of the primary reflector 12, the areas 804 and 884 are still relatively small. Accordingly, secondary reflectors 14 positioned in these areas and oriented to returned reflected light from the primary reflector 12 to the apex O thereof are still quite effective in collecting solar energy. A small portion of the light reflected on the east and west sides of the primary reflector 12 passes across the north side of the primary reflector 12. The remaining portion of the north side is encompassed within the umbra 964.

From the illustrations of FIGS. 6-16, it is apparent that at least the reflecting faces on the east and west sides of the primary reflector 12 of the invention are quite effective throughout the year. Moreover, the reflection from the reflecting faces on the south side of the primary reflector 12 may be utilized for a major portion of the solar year, and are available through the day during that time. While FIGS. 9-16 illustrate only the reflection patterns at noon on various days throughout the solar year, patterns comparable to that described in connection with FIG. 6 may also be observed.

It must be understood that the specific reflection patterns of different pyramids will vary considerably with the latitude and longitude at which they are located, with the time of day, and with the day during the solar year. However, the principles of solar energy collection illustrated are applicable on a commercial basis throughout the major populated regions of the earth. Furthermore, the solar energy collection system of the invention has the unique advantage of employing a minimum of moving parts to concentrate and focus incident solar energy. Thus the disadvantages of heliostats and other systems involving a great number of moving parts in solar tracking are avoided.

Undoubtedly, numerous variations and modifications of the present invention will become readily apparent to those familiar with solar energy collection. For example, the system of the invention may be utilized to collect microwaves relayed by satellite, as well as any other form of reflectable energy. Also, certain refinements in the embodiments of the invention may be adviseable. For example, it may be prudent to provide the embodiment of the system of FIGS. 4A and 4B with a protective dome, mounted on rollers much like a telescope dome, to protect the working mechanisms of the system. Also, while the movement of the carriages and mirror backings for the mobile secondary reflectors 14' in the embodiment of FIGS. 4A, 4B and 4C is under the control of a computer 133, other means for effectuating control are possible. For example, the carriages can be driven by a mechanical drive with the mirror backings being raised and lowered by a follower on a cam track. Accordingly, the scope of the invention should not be construed as limited to the specific embodiments depicted, but rather is defined in the claims appended hereto.

APPENDIX 1

| SECONDARY REFLECTOR NUMBER (N, S, E, W) | coordinate N-S | coordinate E-W | above/below horizontal −/+ | SECONDARY REFLECTOR MIRROR ANGLE TO HORIZONTAL | TRUE BEARING TO CENTER OF BASE 27 |
|---|---|---|---|---|---|
| N#1 | 5N | 0 E/W | −1.0 | 046.0° | 180° |
| N#2 | 6N | 0 E/W | −.978 | 050.5° | 180° |
| N#3 | 7N | 0 E/W | −.956 | 055.0° | 180° |
| N#4 | 8N | 0 E/W | −.934 | 057.7° | 180° |
| N#5 | 9N | 0 E/W | −.912 | 061.6° | 180° |
| N#6 | 10N | 0 E/N | −.868 | 067.5° | 180° |
| S#1 | 5S | 0 E/W | −1.000 | 046.0° | 000° |
| S#2 | 6S | 0 E/W | −.978 | 050.5° | 000° |
| S#3 | 7S | 0 E/W | −.956 | 055.0° | 000° |
| S#4 | 8S | 0 E/W | −.934 | 057.7° | 000° |
| S#5 | 9S | 0/E/W | −.912 | 061.6° | 000° |
| S#6 | 10S | 0 E/W | −.890 | 065.0° | 000° |
| S#7 | 11S | 0 E/W | −.868 | 067.5° | 000° |
| S#8 | 12S | 0 E/W | −.846 | 068.5° | 000° |
| S#9 | 13S | 0 E/W | −.824 | 069.5° | 000° |
| S#10 | 14S | 0 E/W | −.802 | 070.2° | 000° |
| S#11 | 15S | 0 E/W | −.780 | 072.0° | 000° |
| S#12 | 16S | 0 E/W | −.758 | 073.0° | 000° |
| S#13 | 17S | 0 E/W | −.736 | 074.0° | 000° |
| S#14 | 18S | 0 E/W | −.714 | 075.8° | 000° |
| S#15 | 19S | 0 E/W | −.692 | 075.9° | 000° |
| S#16 | 20S | 0 E/W | −.670 | 076.0° | 000° |
| S#17 | 21S | 0 E/W | −.648 | 076.7° | 000° |
| S#18 | 22S | 0 E/W | −.626 | 077.8° | 000° |
| S#19 | 23S | 0 E/W | −.593 | 078.9° | 000° |
| S#20 | 24S | 0 E/W | −.560 | 079.5° | 000° |
| S#21 | 25S | 0 E/W | −.527 | 080.2° | 000° |
| S#22 | 26S | 0 E/W | −.494 | 080.5° | 000° |
| S#23 | 27S | 0 E/W | −.462 | 080.6° | 000° |
| S#24 | 28S | 0 E/W | −.429 | 080.6° | 000° |
| S#25 | 29S | 0 E/W | −.396 | 081.0° | 000° |
| S#26 | 30S | 0 E/W | −.363 | 081.4° | 000° |
| S#27 | 31S | 0 E/W | −.330 | 081.6° | 000° |
| S#28 | 32S | 0 E/W | −.297 | 081.8° | 000° |
| S#29 | 33S | 0 E/W | −.294 | 081.9° | 000° |
| S#30 | 34S | 0 E/W | −.231 | 082.5° | 000° |
| S#31 | 35S | 0 E/W | −.198 | 083.0° | 000° |
| S#32 | 36S | 0 E/W | −.165 | 083.2° | 000° |
| S#33 | 37S | 0 E/W | −.133 | 083.3° | 000° |
| S#34 | 38S | 0 E/W | −.099 | 083.4° | 000° |
| S#35 | 39S | 0 E/W | −.067 | 083.5° | 000° |
| S#36 | 40S | 0 E/W | −.034 | 083.5° | 000° |
| S#37 | 41S | 0 E/W | ±.000 | 083.5° | 000° |
| S#38 | 42S | 0 E/W | +.034 | 083.5° | 000° |
| S#39 | 43S | 0 E/W | +.068 | 083.5° | 000° |
| S#40 | 44S | 0 E/W | +.102 | 083.5° | 000° |
| E#1 | .2N | 05E | −1.000 | 046° | 267.2° |
| E#2 | .4N | 06E | −.978 | 050.5° | 266.2° |
| E#3 | .6N | 07E | −.956 | 055.0° | 265.5° |
| E#4 | .8N | 08E | −.934 | 057.7° | 264.8° |
| E#5 | 1.0N | 09E | −.912 | 061.6° | 264.3° |
| E#6 | 1.2N | 10E | −.890 | 065.0° | 264.0° |
| E#7 | 1.4N | 11E | −.868 | 067.5° | 263.6° |
| E#8 | 1.5N | 12E | −.846 | 068.5° | 263.4° |
| E#9 | 1.7N | 13E | −.824 | 069.5° | 263.3° |
| E#10 | 1.9N | 14E | −.802 | 070.2° | 263.2° |
| E#11 | 2.0N | 15E | −.780 | 072.0° | 263.0° |
| E#12 | 2.3N | 16E | −.758 | 073.0° | 262.7° |
| E#13 | 2.4N | 17E | −.736 | 074.0° | 262.5° |

APPENDIX 1-continued

| SECONDARY REFLECTOR NUMBER (N, S, E, W) | coordinate N-S | coordinate E-W | above/below horizontal −/+ | SECONDARY REFLECTOR MIRROR ANGLE TO HORIZONTAL | TRUE BEARING TO CENTER OF BASE 27 |
|---|---|---|---|---|---|
| E#14 | 2.6N | 18E | −.714 | 075.8° | 262.2° |
| E#15 | 2.8N | 19E | −.692 | 075.9° | 262.0° |
| W#1 | .2N | 05W | −1.000 | 046° | 092.75° |
| W#2 | .4N | 06W | −.978 | 050.5° | 093.75° |
| W#3 | .6N | 07W | −.956 | 055.0° | 094.5° |
| W#4 | .8N | 08W | −.934 | 057.7° | 095.2° |
| W#5 | 1.0N | 09W | −.912 | 061.6° | 095.7° |
| W#6 | 1.2N | 10W | −.890 | 065.0° | 096.0° |
| W#7 | 1.4N | 11W | −.868 | 067.5° | 096.4° |
| W#8 | 1.5N | 12W | −.846 | 068.5° | 096.6° |
| W#9 | 1.7N | 13W | −.824 | 069.5° | 096.7° |
| W#10 | 1.9N | 14W | −.802 | 070.2° | 096.75° |
| W#11 | 2.0N | 15W | −.780 | 072.0° | 097.0° |
| W#12 | 2.3N | 16N | −.758 | 073.0° | 097.3° |
| W#13 | 2.4N | 17W | −.736 | 074.0° | 097.5° |
| W#14 | 2.6N | 18W | −.714 | 075.8° | 097.8° |
| W#15 | 2.8N | 19W | −.692 | 075.9° | 098.0° |

I claim:

1. A solar energy collecting system comprising a primary reflector located in open exposure to the sun and formed of a plurality of intersecting reflecting surfaces, at least some of which are bounded by at least two adjacent arris lines of a pyramid having a polygonal base, and at least a pair of said reflecting surfaces bounded by said adjacent arris lines intersect at an obtuse angle in a line which lies in a plane perpendicular to said base, whereby said pair of reflecting surfaces defines a dihedral, and the reflecting surfaces bounded by said two arris lines reflect light impingent thereon into a concentrated field of reflection, and when projected onto a plane defined by said two arris lines, define a face of said pyramid, at least one secondary reflector located within said concentrated field of reflection and oriented to return light reflected from said reflecting surfaces of said primary reflector to the apex of said pyramid, and solar energy collection means located so as to receive light reflected to the apex of said pyramid.

2. A solar energy collecting system according to claim 1 in which the sine of one half said obtuse angle is about 0.999952.

3. A solar energy collecting system according to claim 1 in which the lower edge of said dihedral lies in a plane parallel to and spaced above said pyramid base, and the portion of said face of said primary reflector between said lower edge of said dihedral and said pyramid base is comprised of:
  a reflecting surface shaped as an isosceles triangle having a base lying within said pyramid base and equidistant from adjacent corners of said pyramid base and parallel to the side of said pyramid base extending between said adjacent corners, and
  reflecting surfaces shaped as parallelograms defined by the lower edge of said dihedral, by said pyramid base adjacent said base of said isosceles triangle, by the sides of said isosceles triangle and by arris lines extending to said adjacent corners of said pyramid.

4. A solar energy collection system according to claim 1 in further comprising secondary reflector mounting means located outside of said pyramid and within the path of movement of said concentrated field of reflection, and a plurality of secondary reflectors are mounted in mobile fashion upon said secondary reflector mounting means, and further comprising driving means to move said secondary collectors upon said mounting means to maintain them in said concentrated field of reflection throughout at least a portion of a solar day.

5. A solar energy collecting system according to claim 1 in which said adjacent arris lines intersect said base at adjacent corners of said pyramid, and the ratio of the vertical elevation of said apex above said base to the distance between said adjacent corners is about 0.64 to 1 and the ratio of the length of one of said arris lines to the distance between said adjacent corners is about 0.95 to 1.

6. A solar energy collecting system according to claim 1 in which edges of said plurality of reflecting surfaces define four arris lines and the reflecting surfaces bounded by adjacent arris lines, when projected onto the four planes defined by the corresponding intersecting, adjacent arris lines, define a pyramid having four equal faces and a square base, and said primary reflector has a polygonal base with at least eight sides and is circumscribed within and coplanar with said square base of said pyramid, and the corners of said square pyramid base are coincident with some of the corners of said polygonal primary reflector base, and said primary reflector has a plurality of pairs of reflecting surfaces each bounded by a pair of adjacent arris lines, and the reflecting surfaces within each of said pairs intersect at the same obtuse angle above said polygonal primary reflector base to form dihedrals.

7. A solar energy collecting system according to claim 6 further characterized in that opposite sides of said square pyramid base respectively face the true north and true south poles of the earth.

8. A solar energy collecting system according to claim 1 in which the aforesaid dihedral is a first dihedral and the upper edge of said first dihedral lies in a plane parallel to and spaced above said base, and the portion of said primary reflector bounded by said adjacent arris lines between said upper edge of said first dihedral and the apex of said pyramid is comprised of further reflecting surfaces that intersect at an obtuse angle in a line which lies in said plane perpendicular to said base, whereby said further reflecting surfaces form a second dihedral, and the planes in which the further reflecting surfaces of said second dihedral lie are at greater angles relative to said base than the planes in which the reflecting surfaces of said first dihedral lie.

9. A solar energy collecting system according to claim 1 in which there are a plurality of secondary reflectors located at varying distances from the base of said pyramid, and said secondary reflectors are inclined from the horizontal at angles that increase with distance of said secondary reflectors from a line joining the closest adjacent corners of said pyramid base.

10. A solar energy collecting system according to claim 9 further characterized in that said secondary reflectors are located at elevations that increase with distance of said secondary reflectors from a line joining the closest adjacent corners of said pyramid base.

11. A solar energy collecting system according to claim 9 in which said secondary reflectors are located in stationary positions.

12. A solar energy collecting system according to claim 10 further characterized in that at least one of said secondary reflectors is located adjacent the base of said pyramid at an elevation below the grade of said base.

13. A solar energy collecting system according to claim 10 further characterized in that the furthest of said secondary reflectors is mounted at a level low enough to allow incidence of solar light on said primary reflector throughout the solar year.

14. A solar energy collecting system according to claim 12 further characterized in that said secondary reflector located adjacent the base of said pyramid is located a distance below the grade of said base equal to about 0.00398 times the length of a side of said polygonal base.

15. In a solar energy collecting system comprising a reflector disposed on the surface of a backing, the improvement comprising a plurality of planar reflecting surfaces arranged in fixed disposition relative to each other, pairs of said planar surfaces intersecting each other along a line, said line oriented at a non-perpendicular angle to the surface of the backing, said surfaces forming at least one fixed obtuse angle said surfaces reflecting light impingent thereon into a concentrated field of reflection including a region of double reflection, a solar energy collection means, and means for moving said reflector to track the sun while maintaining said reflecting surfaces in the aforesaid fixed disposition relative to each other so that said collection means is continuously located within said region of double reflection.

16. In a solar energy collecting system employing a solar energy collector and at least one reflector for focusing light into said solar energy collector, comprising a backing at least two planar reflecting surfaces which are arranged in fixed disposition relative to each other and which intersect along a line to form at least one obtuse angle and which reflect light impingent thereon into a region of overlapping reflections said line oriented at a non-perpendicular angle to the surface of the backing, and means for mounting said reflector in mobile fashion to track the azimuth and zenith of the sun according to inputs determined by latitude and longitude, time of solar day, and the date of the solar year to maintain said reflector in focus on said solar energy collector with said solar energy collector remaining in said region of overlapping reflections while said reflecting surfaces remain in said fixed disposition relative to each other.

17. A solar energy collecting system according to claim 16 in which said means for mounting moves said reflector in arcs in both horizontal and vertical planes to maintain said reflector in focus on said solar energy collector.

18. A solar energy collection system comprising a primary reflector located in open exposure to the sun and having a plurality of inclined reflecting surfaces, at least some of which are bounded by at least two adjacent arris lines of a pyramid having a polygonal base with adjacent corners defined by the intersection of said adjacent arris lines therewith, and at least two of said bounded reflected surfaces intersect each other at an obtuse angle along a line equidistant from said adjacent corners of said pyramid base, so as to reflect light impingent thereon into a concentrated field of solar reflection, at least one secondary reflector located within said concentrated field of solar reflection, and oriented to reflect light from said intersecting reflecting surfaces to the apex of said pyramid defined at the intersection of said adjacent arris lines, and solar energy collection means located to receive light reflected to said apex of said pyramid.

19. A solar energy collection system according to claim 18 in which said reflecting surfaces are constructed of externally mirrored material.

20. A solar energy collection system according to claim 18 comprising a plurality of secondary reflectors mounted in mobile fashion and means for driving said secondary reflectors to remain within said concentrated field of solar reflection as said field moves throughout a solar day.

21. A solar energy collecting system according to claim 18 in which the ratio of the distance of the apex of said pyramid above said polygonal base is about 0.636201719 to 1.

22. A solar energy collecting system according to claim 18 in which said pyramid has a square base and said primary reflector has a polygonal base inscribed within said pyramid base such that the corners of said pyramid base are coincident with some of the corners of said primary reflector base and said primary reflector has at least three levels of reflecting surfaces defined between said polygonal primary reflector base and said apex of said pyramid and between adjacent arris lines of said pyramid which levels are delineated by at least two separate planes spaced above said polygonal base and parallel thereto, and the lowest level of said reflective surfaces includes a reflecting surface shaped an an isosceles triangle having a base forming one of the sides of said poylgonal primary reflector base and positioned equidistant from said adjacent corners of said pyramid base and parallel to and inset from a line extending between said adjacent corners, and said lowest level also includes reflecting surfaces shaped as mirror image parallelograms on either side of said isosceles triangle and contacting each other only at the apex of said isosceles triangle, and said level of surfaces immediately above said lowest level includes mirror image quadrilateral reflecting surfaces defined between portions of said adjacent arris lines and intersecting at said obtuse angle to form a first dihedral, and the next highest level of said reflective surfaces includes a second dihedral defined between portions of said adjacent arris lines and the reflecting surfaces of said second dihedral lie in planes forming greater angles with said polygonal base than do the planes in which said reflecting surfaces of said first dihedral lie.

23. A solar energy collecting system according to claim 22 in which the ratio of the length of said base of said isosceles triangle to the distance between said adjacent pyramid base corners is about 0.0039 to 1.

24. A solar energy collecting system according to claim 22 in which the ratios of the distances of separation of said two planes delineating said levels of reflecting surfaces from said polygonal base, relative to the distance between said adjacent pyramid base corners are about 0.1272 to 1 and 0.5726 to one.

25. In a system for collecting reflectable electromagnetic radiation, comprising a reflector disposed on the surface of a backing, the improvement comprising planar reflecting surfaces which are disposed in fixed positions relative to each other and which intersecting each other along a line, said line oriented at a non-perpendicular angle to the surface of the backing and forming at least one obtuse angle, said surfaces reflecting electromagnetic radiation impingent thereon into a concentrated field of reflection including a region of high intensity double reflection, an electromagnetic energy collector, and means for driving said reflector to maintain said region of high intensity double reflection centered upon said collector while maintaining said reflecting surfaces at said fixed positions relative to each other.

26. A solar energy collecting system comprising a primary reflector located in open exposure to the sun and shaped to form at least a portion of a modified pyramid having an otherwise square base modified so that at least one of the sides of said pyramid is bifurcated at obtuse angles to form reflecting surfaces which intersect at a dihedral angle along the apothem of the pyramid, at least one secondary reflector located within the field of reflection of said reflecting surfaces of said modified pyramid and oriented to return light reflected from said reflecting surfaces of said modified pyramid to the apex of said modified pyramid, and a solar energy collector located so as to receive light reflected to the apex of said modified pyramid.

27. A solar energy collecting system comprising a primary reflector located in open exposure to the sun and constructed to form at least a porton of a modified pyramid having a plurality of reflecting faces mounted on a polygonal base, at least one of the enclosed angles of which is a reentering angle, said modified pyramid having at least two reflecting faces intersecting the sides of said polygon forming said reentering angle, at least one secondary reflector located within the field of light reflection from the aforesaid two reflecting faces of said primary reflector and oriented to reflect light therefrom to the apex of said pyramid, and a solar energy collector located to receive light reflected to the apex of said primary reflector.

28. A solar energy collecting system according to claim 27 in which said polygonal base is an equilateral octagon, alternate enclosed angles of which are reentering angles, and said reflecting faces are formed as pairs of trapezoids having corresponding sides of equal length, the trapezoids in each pair intersecting in a dihedral angle.

29. An electromagnetic radiation collecting system comprising a primary reflector located in open exposure to a source of reflectable electromagnetic radiation and having a plurality of inclined reflecting surfaces, at least some of which are bounded by at least two adjacent arris lines of a pyramid having a polygonal base, and at least two of said bounded reflecting surfaces intersect each other at an obtuse angle in a line which lies in a plane perpendicular to said base, whereby said reflecting surfaces form a dihedral so as to reflect electromagnetic radiation impingent thereon into a concentrated field of reflection, at least one secondary reflector located within the concentrated field of reflection of said reflecting surfaces of said primary reflector and oriented to return electromagnetic radiation reflected from said reflecting surfaces of said primary reflector to the apex of said pyramid, and electromagnetic radiation collecting means located so as to receive electromagnetic radiation reflected to the apex of said primary reflector.

30. A solar energy collection system comprising a primary reflector located in open exposure to the sun and having a plurality of inclined reflecting surfaces, at least some of which are bounded by at least adjacent arris lines of a pyramid having a polygonal base with adjacent corners defined by the intersection of said adjacent arris lines therewith, and at least two of said bounded reflecting surfaces intersect each other at an obtuse angle along a line equidistant from said adjacent corners of said pyramid base, so as to reflect light impingent thereon into a concentrated field of solar reflection, and at least one secondary reflector, tracking means for moving said secondary reflector to maintain said secondary relector within said concentrated field of solar reflection while said concentrated field of reflection exists, means for orienting said secondary reflector to reflect light from said intersecting reflecting surfaces to the apex of said pyramid and for reorienting said secondary reflector to receive direct rays of the sun in the absence of said concentrated field of solar reflection so that said secondary reflector thereupon reflects the direct rays of the sun and focuses them toward the apex of said pyramid, and solar energy collection means located so as to receive light reflected to said apex of said pyramid.

* * * * *